Patented Mar. 14, 1933

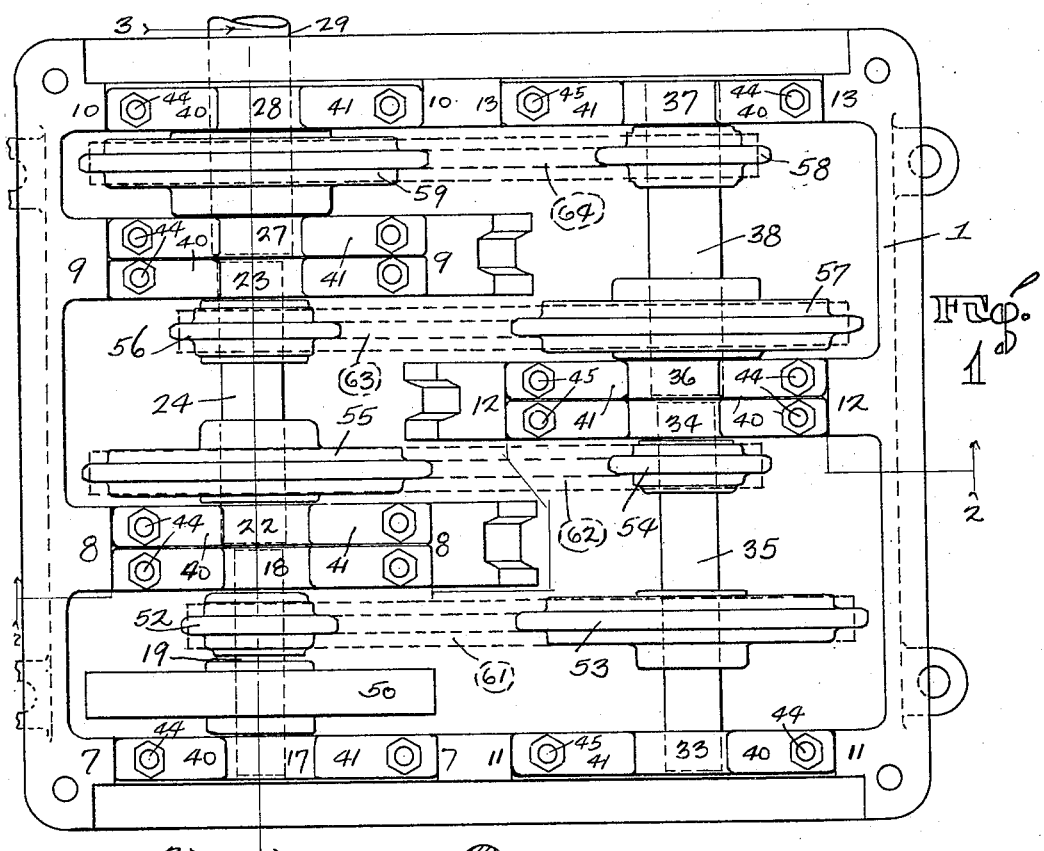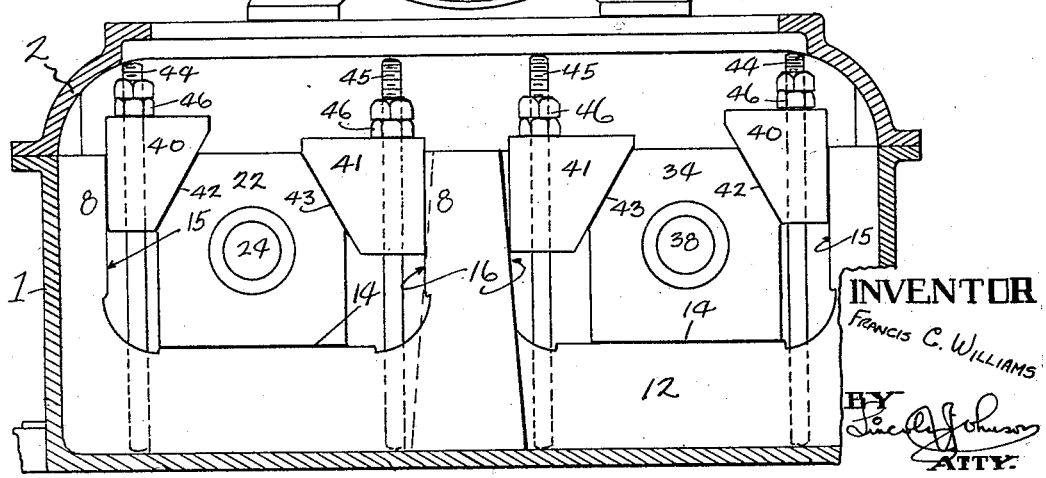

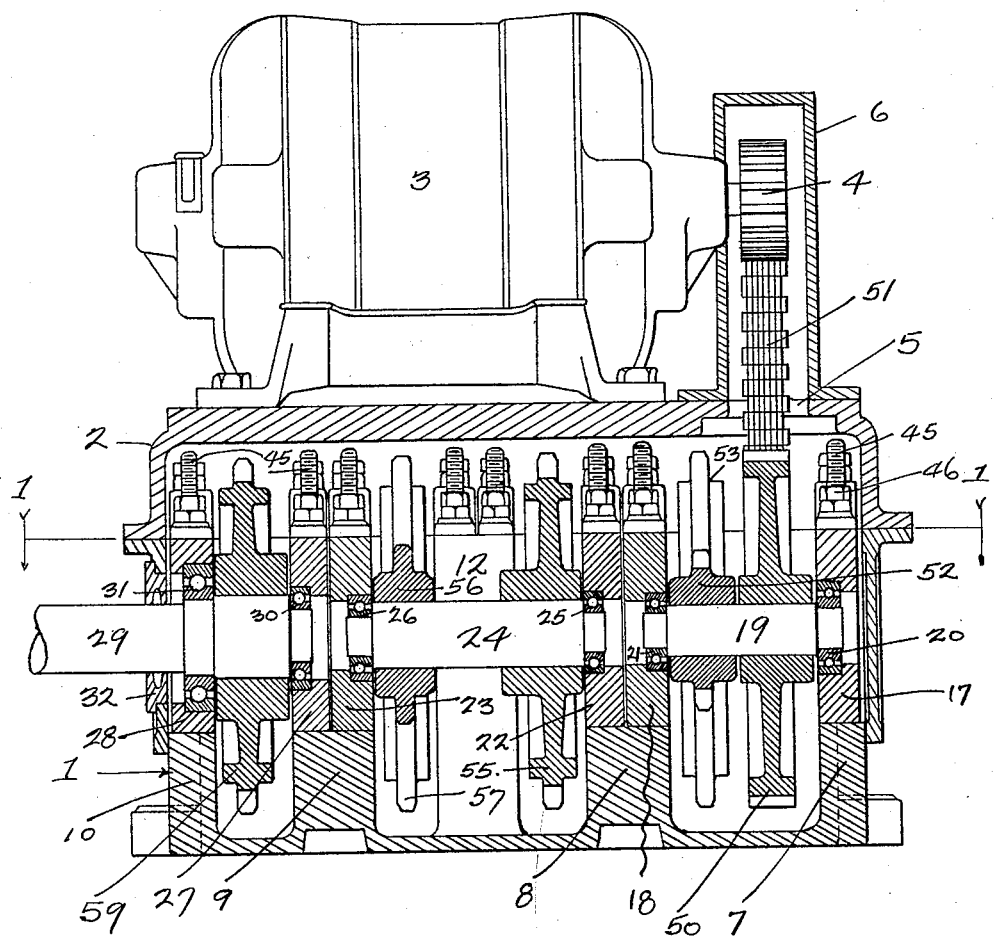

1,901,619

UNITED STATES PATENT OFFICE

FRANCIS C. WILLIAMS, OF DETROIT, MICHIGAN

SPEED REDUCTION TRANSMISSION AND ADJUSTABLE BEARINGS THEREFOR

Application filed March 23, 1932. Serial No. 600,809.

This invention relates particularly to an apparatus to reduce the speed of the rotative power impulses delivered from a drive shaft to a driven shaft.

An object of the invention is to provide a speed reduction transmission to reduce to a comparatively small number of revolutions per minute, or vice versa, for work purposes, the relatively great number of revolutions per minute delivered by a motor, engine or the like.

A further object of the invention is to provide a transmission that consists of a drive shaft and a driven shaft connected with a speed reduction driving means interposed between the ends of the aforementioned shafts, the speed reduction driving means consisting of a pair of rows of split shafts arranged in offset relation and having the related driving means on the said shafts staggered to form a compact structure.

A still further object of the invention is to provide a speed reduction device having a power intake and a power outlet thereon and with a pair of rows of individual shafts journaled between the power intake and power outlet, each of the said shafts having speed reduction driving means thereon whereby the respective rows are placed in operative engagement one with the other, and the individual shafts are mounted in bearings whereby shafts in either row may be adjusted relative to the shafts in the same row or in an adjoining row.

Other objects of the invention relate to an adjustable shaft bearing comprised of a pair of wedge shaped blocks adapted to engage on opposite sides of a shaft bearing and a fixed bearing to move the shaft bearing relative to the fixed bearing; and to a speed reduction device of the character described that is superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings

Fig. 1 is a plan view taken through Fig. 3 on the line 1—1, showing a speed reduction apparatus constructed in accordance with my invention.

Fig. 2 is an end view taken through Fig. 1 on the line 2—2.

Fig. 3 is a vertical section taken through Fig. 1 on the line 3—3.

It is better engineering practice to provide individual machines and apparatuses, such as lathes, milling machines, hoists, presses, and the like, with separate power plants, in contradistinction to the method of operating a number of such machines by belts from a single power unit. It is usually necessary to reduce the speed of operation, or the revolutions per minute, of the average motor driving any particular piece of machinery, in order that the power generated by the said motor can be delivered to the point of work at a controlled and selected speed calculated to produce the greatest efficiency of operation. There are many types of apparatuses to accomplish speed reduction, and my invention relates in general to an apparatus of that character, but my apparatus is provided with means of operation and adjustment that is desirable over the conventional type of speed reduction device.

In detail, the construction illustrated in the drawings comprises an open sided housing 1, that is adapted to be closed by a cover 2. The cover 2 is shaped to form a base for an electrically driven motor 3, or other type of prime mover, one end of the motor shaft having a driving gear or sprocket 4 fixed thereon in registry with an opening 5, in the cover 3, for the purpose to be hereinafter described. The motor drive gear 4 and the slot 5, through the cover 3, are enclosed by a casing 6 that is securely anchored onto the upper face of the cover 2.

Along one side of the interior of the housing 1, I have provided a row of independent and substantially U shaped bearing supports 7, 8, 9 and 10 respectively, and a similar row of bearing supports 11, 12, and 13, respectively, arranged in parallel relation to the first mentioned row along the opposite side of the casing 1. Each individual bearing support consists of a substantially level, bottom edge 14 and a pair of opposed upright edges 15 and 16 extended at right angles to the bottom edge 14. The bearing supports 7 and 11 are arranged side by side on one end of the housing, and the complementary bearing supports 10 and 13 are arranged side by side in the opposite end of the housing. The intermediate bearing supports 8 and 9 are arranged in spaced relation relative to each other, and are positioned in alignment with the bearing supports 7 and 10 on the opposite ends of the housing. The bearing support 12 is arranged substantially midway between the end bearing supports 11 and 13 and is spaced between the bearing supports 8 and 9 of the parallel row.

A pair of bearing blocks 17 and 18 have their bottom edges mounted on the level bases 14 of each of the bearing supports 7 and 8. A shaft 19 is rotatably journaled at its opposite ends in roller bearings 20 and 21 secured within the bearing blocks 17 and 18 respectively. A similar pair of bearing blocks 22 and 23 are mounted in the bearing supports 8 and 9, and connected together by a shaft 24 journaled at its opposite ends in the roller bearings 25 and 26, mounted in said bearing blocks. A third pair of bearing blocks 27 and 28 are arranged in the bearing supports 9 and 10. A driven shaft 29 has one end rotatably mounted in the roller bearings 30 and 31 that are held in the respective bearing blocks 27 and 28, respectively. The driven shaft 29 extends out through a packing gland 32 in the side of the housing 1 and said driven shaft 29 is connected to the working unit or apparatus to which the reduced speed power is to be delivered. The bearing blocks 17—18, 22—23 and 27—28 are arranged in substantial axial alignment on the respective bearing supports.

On the opposite side of the housing 1, the bearing blocks 33 and 34 are arranged in the bearing supports 11 and 12. The bearing blocks 33 and 34 have ends of the shaft 35 revolubly journaled therein. A similar pair of bearing blocks 36 and 37 are mounted in the bearing blocks 12 and 13, in substantial registry with the bearing blocks 33 and 34, said bearing blocks 36 and 37 having the opposite ends of a shaft 38 revolubly journaled therein.

The shafts 19, 24 and 29, on one side of the housing, have the ends thereof offset relative to the ends of the shafts 35 and 38 along the opposite side of the housing. For example, the opposite ends of the middle shaft 24, on one side of the housing register, substantially, with the middle sections of the shafts 35 and 38 on the opposite side of the housing; and also the abutting ends of the shafts 35 and 38 register, substantially, with the center of the middle shaft 24 in the opposite row. The individual shafts in each of the separate rows are arranged in staggered or offset relation for the purpose to be hereinafter described.

Each one of the individual bearing blocks, that support the ends of the various shafts in the housing, is held in a definite location within its own bearing support by a pair of interposed wedge blocks 40 and 41. The wedge blocks each have one face thereof beveled to conformably engage beveled edges 42 and 43 on each of the individual bearing blocks. The wedge block 40 has one side thereof in contact with the vertical side edge 15 of the U shaped bearing support and the beveled edge of the same wedge block lies in engagement with the beveled edge 42 of the bearing block. In a similar manner, one edge of the opposite wedge blocks 41 lies in contact with the vertical edge 16 of the U shaped bearing support while the beveled edge of the same wedge block 41 lies in engagement with the opposite beveled edge 43 of the bearing block. The wedge blocks 40 and 41 are guided in their vertical movements by the threaded shafts 44 and 45 respectively, each of which are secured at their bottom ends to the individual bearing supports. The upper ends of each of the shafts 44 and 45 are threaded to receive binding nuts 46 that may be advanced into or withdrawn from contact with the upper edges of each of the wedge blocks 40 and 41 to control the engagement of said wedge blocks between the opposite beveled sides of the bearing block and the vertical side walls of the bearing support. It is obvious that by unloosening the binding nuts on one wedge block, and advancing the binding nuts into engagement with the opposite wedge block, that the bearing lock may be moved laterally on the bearing support. Either of the wedge blocks 40 or 41 may be utilized to shift the bearing block on the bearing support. The wedge blocks 40 and 41 are purposely made of different sizes in order that after the bearing blocks has been moved laterally the maximum distance of the smaller wedge block, the positions of the respective wedge blocks may be reversed and additional lateral movement of the bearing block gained by moving the larger sized wedge block. Any end thrust of the individual shafts is taken up in the individual bearing blocks, so that each individual shaft is not dependent for position on any other shaft or bearing in the apparatus. Because each of the shafts are individually mounted in a separate pair of bearings, it is possible to move each individual shaft laterally relative to the other shafts in the same row or the shafts in the parallel row.

The shaft 19 is provided with a gear 50 thereon, which registers with the opening 5 in the cover of the housing, and said gear 50 is adapted to be operatively connected by a drive chain 51 to the motor gear 4. The motor is directly connected to the drive gear 50, and the shaft 19 thus becomes the medium through which the driving power is transmitted to and through the other shafts in the apparatus to the driven shaft 29. A sprocket 52 is fixed on the shaft 19 directly opposite a large diametered sprocket 53 that is keyed on the shaft 35. The shaft 35 is also provided with a smaller diametered sprocket 54 thereon that is directly opposite a larger diametered sprocket 55 that is keyed on the shaft 24, in the opposite row. A small diametered sprocket 56 is provided on the other end of the shaft 24 directly opposite the large diametered sprocket 56 on the shaft 38. A small diametered sprocket 58 is keyed on the other end of the shaft 38 directly opposite the larger diametered sprocket 59 that is keyed on the driven shaft 29. Each of the registering sprockets 52—53, 54—55, 56—57, and 58—59, are operatively connected together by the drive chains 61, 62, 63 and 64. The respective pairs of sprockets are arranged on each of the individual shafts so that the pair of sprockets on any one shaft will not lie directly opposite any other pair of sprockets on one of the shafts in the parallel row.

By reason of the respective individual shafts being offset as heretofore described, and the pairs of sprockets in opposite rows arranged thereon in the manner heretofore set forth, it is obvious that the motive power will be delivered to the shaft 19, thence laterally across the casing to the shaft 35, thence back to the shaft 24, thence over to the shaft 38, and thence back to the driven shaft 29. By reason of the various sprockets on the independent shafts being of different diameters, the ratios of each, one to the other, will cause the speed of the drive motor to be reduced materially by the time the power is delivered to the driving shaft 29. The drive chains connecting the various sprockets are an effective form of silent drive, to reduce power losses to the minimum between the point of origin of the power and the point of delivery.

In the event that the drive chain connecting any pair of sprockets should become loose, or should it require tightening, the various sprocket shafts can be adjusted laterally by movement of the shaft bearing blocks that are mounted on the bearing supports, and the position thereof controlled by the adjustable wedge blocks. Although I have shown but two rows of bearing supports it is to be understood that it would be clearly within the purview of the invention to provide a greater number of bearing supports and the necessary driving mechanism, incidental thereto, constructed and arranged in accordance with the invention illustrated and described herein.

Although I have illustrated the invention with the chain drive, I want it to be understood that it would be within the scope of the invention to substitute spur or herringbone gears in lieu of the drive chains. The adjustment between shafts can be taken care of by varying the amount of contact of the teeth of the meshing gears.

Having thus described this invention, what I now claim and desire to secure by Letters Patent is:

1. A device such as described comprising a housing; plural rows of pairs of bearings arranged within said housing; a separate shaft rotatably mounted in each pair of bearings in the plural rows, whereby all the separate shafts in one row of bearings will be parallel to all of the separate shafts in the other rows of bearings; means to adjust the pairs of bearings supporting each separate shaft to move said shaft parallely relative to the shafts in the other rows; a pair of related sprockets on each of the separate shafts registering with a pair of independent sprockets adjoining separate shafts on opposite rows; a drive chain connecting each of the registering pairs of sprockets on opposite rows; a power means to drive one of the shafts; and a driven unit to be connected to one of said shafts.

2. A speed reduction device comprised of a housing; a row of supporting bearings for a plurality of shafts arranged in said housing; a row of supporting bearings for a plurality of independent shafts parallel to the first mentioned row of bearings; a plurality of independent shafts journaled in each of the parallel rows of supporting bearings; a pair of toothed driving members mounted on each of the plurality of shafts in each of the parallel rows, the toothed driving members of each independent shaft being offset relative to the toothed driving members on a corresponding shaft in the opposite row and in meshing engagement therewith; a driving member mounted on said housing and operatively connected to one of the toothed members; a driven shaft journaled in one of the supporting bearings in axial alignment with one of the rows of shaft bearings and operatively connected to the toothed member in an opposite row; and means to adjust the shaft bearings to move each of the independent shafts in the parallel rows relative to each other.

3. A speed reduction device comprised of a housing; a drive shaft journaled in said housing; a driven shaft journaled in said housing; a row of separate shafts adjustably journaled in the housing between the drive and driven shafts in substantial axial alignment therewith; a row of separate shafts adjustably journaled in the housing parallel to the first mentioned row, each of the individual second mentioned shafts being arranged intermediate the ends of the individual shafts in the first mentioned rows; and speed reduction driving means on each of the separate shafts in one row meshing with speed reduction driving means on the separate shafts in the parallel row to transmit power from the drive shaft, through the staggered driving means on the separate shafts in the parallel rows, to the driven shaft.

4. A speed reduction device comprised of a housing; a drive shaft journaled in said housing; a driven shaft journaled in said housing; a row of separate shafts journaled in the housing between the drive and driven shafts in substantial axial alignment therewith; a row of separate shafts journaled in the housing parallel to the first mentioned row, each of the individual second mentioned shafts being arranged intermediate the ends of the individual shafts in the first mentioned rows; speed reduction driving means on each of the separate shafts in one row meshing with speed reduction driving means on the separate shafts in the parallel row to transmit power from the drive shaft through the staggered driving means on the separate shafts in the parallel rows, to the driven shaft; and means to adjust each individual shaft laterally relative to the adjoining shafts in the same row and to the separate shafts in the parallel row.

5. A speed reduction device comprised of a housing; a drive shaft journaled in said housing; a driven shaft journaled in said housing; a row of separate shafts adjustably journaled in the housing between the drive and driven shafts in substantial axial alignment therewith; a row of separate shafts adjustably journaled in the housing parallel to the first mentioned row, each of the individual second mentioned shafts being arranged intermediate the ends of the individual shafts in the first mentioned row; a pair of independent bearings to support the opposite ends of each of the separate shafts in each of the parallel rows; and speed reduction driving means on each of the separate shafts in one row meshing with speed reduction driving means on the separate shafts in the parallel row to transmit power from the drive shaft, through the staggered driving means on the separate shafts in the parallel rows, to the driven shaft.

6. A speed reduction device comprised of a housing; a drive shaft journaled in said housing; a driven shaft journaled in said housing; a row of separate shafts journaled in the housing between the drive and driven shafts in substantial axial alignment therewith; a row of separate shafts journaled in the housing parallel to the first mentioned row, each of the individual second mentioned shafts being arranged intermediate the ends of the individual shafts in the first mentioned rows; a pair of independent bearings to support the opposite ends of each of the separate shafts in each of the parallel rows; speed reduction driving means on each of the separate shafts in one row meshing with speed reduction driving means on the separate shafts in the parallel row to transmit power from the drive shaft, through the staggered driving means on the separate shafts in the parallel rows, to the driven shafts; and means to adjust each individual shaft laterally relative to the adjoining shafts in the same row and to the separate shafts in the parallel row.

7. A speed reduction device comprised of a housing; a drive shaft journaled in said housing; a driven shaft journaled in said housing; a row of separate shafts journaled in the housing between the drive and driven shafts in substantial axial alignment therewith; a row of separate shafts journaled in the housing parallel to the first mentioned row, each of the individual second mentioned shafts being arranged intermediate the ends of the individual shafts in the first mentioned row; a pair of independent bearings having opposite ends of each of the separate shafts in each of the parallel rows journaled therein; wedge blocks arranged between opposite sides of each of the shaft bearings and housing to adjust each individual shaft laterally relative to the adjoining shafts in the same row and to the separate shafts in the parallel row; and speed reduction driving means on each of the separate shafts in one row meshing with speed reduction driving means on the separate shafts in the parallel row to transmit power from the drive shaft, through the staggered driving means on the separate shafts in the parallel rows, to the driven shaft.

8. A speed reduction device comprised of a housing; a motor mounted on said housing; a drive shaft adjustably journaled in said housing and operatively connected to said motor; a driven shaft adjustably journaled in said housing; a row of separate shafts journaled in the housing between the drive and driven shafts in substantial axial alignment therewith; a row of separate shafts journaled in the housing parallel to the first mentioned row, each of the individual shafts in the second mentioned row being arranged intermediate the ends of the individual shafts in the first mentioned row; a pair of independent bearings having the opposite ends of each of the separate shafts in each of the parallel rows journaled therein; wedge blocks arranged between opposite sides of each of the shaft bearings and housing; means on the housing to move the wedge blocks relative to shaft bearings to adjust each individual shaft laterally relative to the adjoining shafts in the same row and to the separate shafts in the parallel row; and speed reduction driving means on each of the separate shafts in one row meshing with speed reduction driving means on the separate shafts in the parallel row to transmit power from the drive shaft, through the staggered driving means on the separate shafts in the parallel rows, to the driven shaft.

In testimony whereof, I have hereunto set my hand at San Francisco, California, this 16th day of August 1930.

FRANCIS C. WILLIAMS.